(12) United States Patent
Chakkera et al.

(10) Patent No.: US 6,487,846 B1
(45) Date of Patent: Dec. 3, 2002

(54) THRUST REVERSER ACTUATOR INCLUDING AN INTEGRATED LOCKING MECHANISM

(75) Inventors: Kevin K. Chakkera, Tempe; Andrew T. Johnson, Scottsdale, both of AZ (US); Kyle D. Eilers, Everett, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/949,431

(22) Filed: Sep. 7, 2001

(51) Int. Cl.[7] ................................................. F02K 1/54
(52) U.S. Cl. .............. 60/226.2; 244/110 B; 239/265.27
(58) Field of Search ..................... 60/226.2; 244/110 B; 239/265.25, 265.27, 265.29, 265.31

(56) References Cited

U.S. PATENT DOCUMENTS

| | | | |
|---|---|---|---|
| 2,191,137 A | | 2/1940 | Trible |
| 2,746,583 A | | 5/1956 | Blevins |
| 3,056,624 A | | 10/1962 | Nardone |
| 3,621,763 A | | 11/1971 | Geyer |
| 3,659,686 A | | 5/1972 | Marklev |
| 4,149,430 A | | 4/1979 | F'Geppert |
| 4,491,059 A | * | 1/1985 | Martin ........................... 92/14 |
| 4,543,783 A | | 10/1985 | Greiine et al. |
| 4,561,527 A | | 12/1985 | Nakamoto et al. |
| 4,586,329 A | * | 5/1986 | Carlin ........................ 60/226.2 |
| 4,714,006 A | * | 12/1987 | Tootle et al. .................. 74/105 |
| 4,987,788 A | | 1/1991 | Bausch |
| 5,280,704 A | * | 1/1994 | Anderson et al. ........... 60/226.2 |
| 5,365,210 A | | 11/1994 | Hines |
| 5,448,884 A | | 9/1995 | Repp |
| 5,609,020 A | * | 3/1997 | Jackson et al. ............. 60/226.2 |

* cited by examiner

Primary Examiner—Ted Kim
(74) Attorney, Agent, or Firm—Keith A. Newburry, Esq.

(57) ABSTRACT

A thrust reverser system includes one or more actuators each having an integrated locking mechanism that prevents unintended actuator movement, and thus unintended thrust reverser movement. Each of the actuators with the integrated locking mechanism includes a housing, a drive shaft, and a lock. The drive shaft includes an outer surface, is rotationally mounted within the housing, and is operable, in response to the operation of the one or more motors, to rotate in a first rotational direction, to thereby move the thrust reverser to the deploy position, and a second rotational direction, to thereby move the thrust reverser to the stow position. The lock is movably mounted within the housing and is operable to move between at least a first position and a second position, and includes at least a side surface and a bottom surface. One or more gears are provided on the outer surface of the drive shaft, each of which is adapted to mesh with gears that are operably coupled to the thrust reverser. In addition, one or more protrusions extend from the outer surface of the drive shaft. Each of the protrusions includes a stop surface configured to fixedly abut the lock side surface when the lock is in the first position, and a tapered surface configured to slidingly abut the lock bottom surface when the lock is in the first position. Thus, rotation of the drive shaft in the first rotational direction is prevented and rotation of the drive shaft in the second rotational direction is allowed when the lock is in the first position.

28 Claims, 7 Drawing Sheets

THRUST REVERSER ACTUATOR INCLUDING AN INTEGRATED LOCKING MECHANISM

BACKGROUND OF THE INVENTION

The present invention relates to a jet engine thrust reverser system and, more particularly, to a thrust reverser system that includes actuators having an integrated locking mechanism.

When jet-powered aircraft land, the landing gear brakes and imposed aerodynamic drag loads (e.g., flaps, spoilers, etc.) of the aircraft may not be sufficient to slow the aircraft down in the required amount of runway distance. Thus, jet engines on most aircraft include thrust reversers to enhance the stopping power of the aircraft. When deployed, thrust reversers redirect the rearward thrust of the jet engine to a forward direction to decelerate the aircraft. Because the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process to slow the aircraft. Thereafter, when the thrust reversers are no longer needed, they are returned to their original, or stowed, position and are locked.

The thrust reversers in each of the above-described designs are moved between the stowed and deployed positions by means of actuators. For flight-safety reasons, it is required that the one or more of the actuators used to move the thrust reversers include a locking function to prevent unintended thrust reverser movement. Current thrust reverser systems incorporate the locking devices as separate units that may attach to one or more components of the thrust reverser system. For example, U.S. Pat. No. 4,586,329 (the '329 patent) discloses a locking device that is coupled to the gear shafts that couple the thrust reverser system actuators together. In another example, U.S. Pat. No. 5,448,884 (the '884 patent) discloses a locking device that is attached to a thrust reverser actuator.

The locking devices disclosed in the '329 patent and the '884 patent are known to be complex and heavy, and are known to increase system inertia and size envelope. Hence, there is a need for a thrust reverser actuator locking device that improves upon one or more of these drawbacks.

SUMMARY OF THE INVENTION

The present invention relates to a system for moving thrust reversers that includes a plurality of actuators each having an integrated locking mechanism that prevents unintended actuator movement, and thus unintended thrust reverser movement.

In one aspect of the present invention, and by way of example only, a system for moving a thrust reverser, includes at least one power source, at least two synchronization mechanisms, and at least two actuators each coupled to at least one of the synchronization mechanisms. At least one of the actuators includes a housing assembly, a drive shaft, an actuator, and a lock. The housing assembly has a first opening, a second opening, a third opening, and a first inside surface defining a first chamber extending along a first axis between the first and second openings, the third opening being located between the first and second openings. The drive shaft is rotationally mounted between the openings within the chamber and in general alignment with the first axis, and has a gear portion, a lock portion and a first end adapted to couple to at least one of the synchronization mechanisms, the gear and lock portions are located within the chamber. The actuator extends from the third opening of the housing along a second axis that is perpendicular to the first axis, and has a drive gear mounted to engage the gear portion of the drive shaft. The lock is movably mounted within the chamber in an opposite, generally opposed position to the actuator, and has at least a side surface and a bottom surface and is selectively operable to move in a plane aligned with the second axis between at least a first position and a second position. The lock portion of the drive shaft has at least one protrusion extending radially outwardly, and each protrusion has a stop surface positioned to engage the lock side surface when the lock is in the first position to prevent the rotation of the drive shaft.

In another exemplary aspect of the present invention, a thrust reverser actuator with an integrated lock for use in a system having at least one synchronization mechanism for moving a thrust reverser between deployed and stowed positions includes a housing assembly, a drive shaft, an actuator, and a lock. The housing assembly has a first opening, a second opening, a third opening, and a first inside surface defining a first chamber extending along a first axis between the first and second openings, the third opening being located between the first and second openings. The drive shaft is rotationally mounted between the openings within the chamber and in general alignment with the first axis, and has a gear portion, a lock portion and a first end adapted to couple to at least one of the synchronization mechanisms, the gear and lock portions are located within the chamber. The actuator extends from the third opening of the housing along a second axis that is perpendicular to the first axis, and has a drive gear mounted to engage the gear portion of the drive shaft. The lock is movably mounted within the chamber in an opposite, generally opposed position to the actuator, and has at least a side surface and a bottom surface and is selectively operable to move in a plane aligned with the second axis between at least a first position and a second position. The lock portion of the drive shaft has at least one protrusion extending radially outwardly, and each protrusion has a stop surface positioned to engage the lock side surface when the lock is in the first position to prevent the rotation of the drive shaft.

Other independent features and advantages of the preferred sensor will become apparent from the following detailed description, taken in conjunction with the accompanying drawings which illustrate, by way of example, the principles of the invention.

DETAILED DESCRIPTION OF THE PREFERRED EMBODIMENTS

Before proceeding with the detailed description of the invention, it is to be appreciated that the present invention is not limited to use in conjunction with a specific thrust reverser system design. Thus, although the present invention is explicitly described as being implemented in a cascade-type thrust reverser system in which transcowls are used as the moveable thrust reverser component, it should be appreciated that it can be implemented in other thrust reverser system designs, including those described above and those known in the art.

Figure 1:
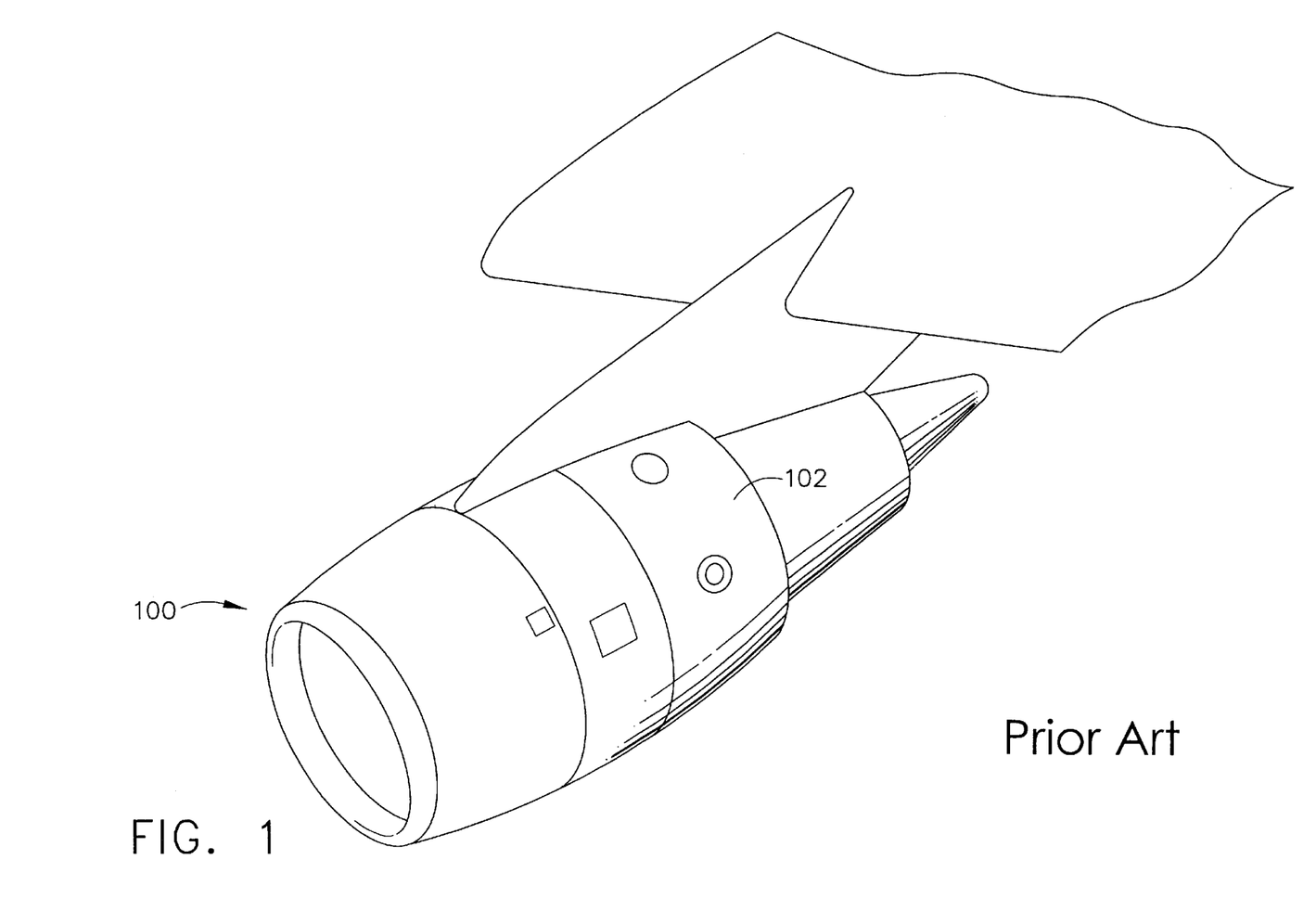
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 that are positioned circumferentially on the outside of the fan case 100.

Figure 2:
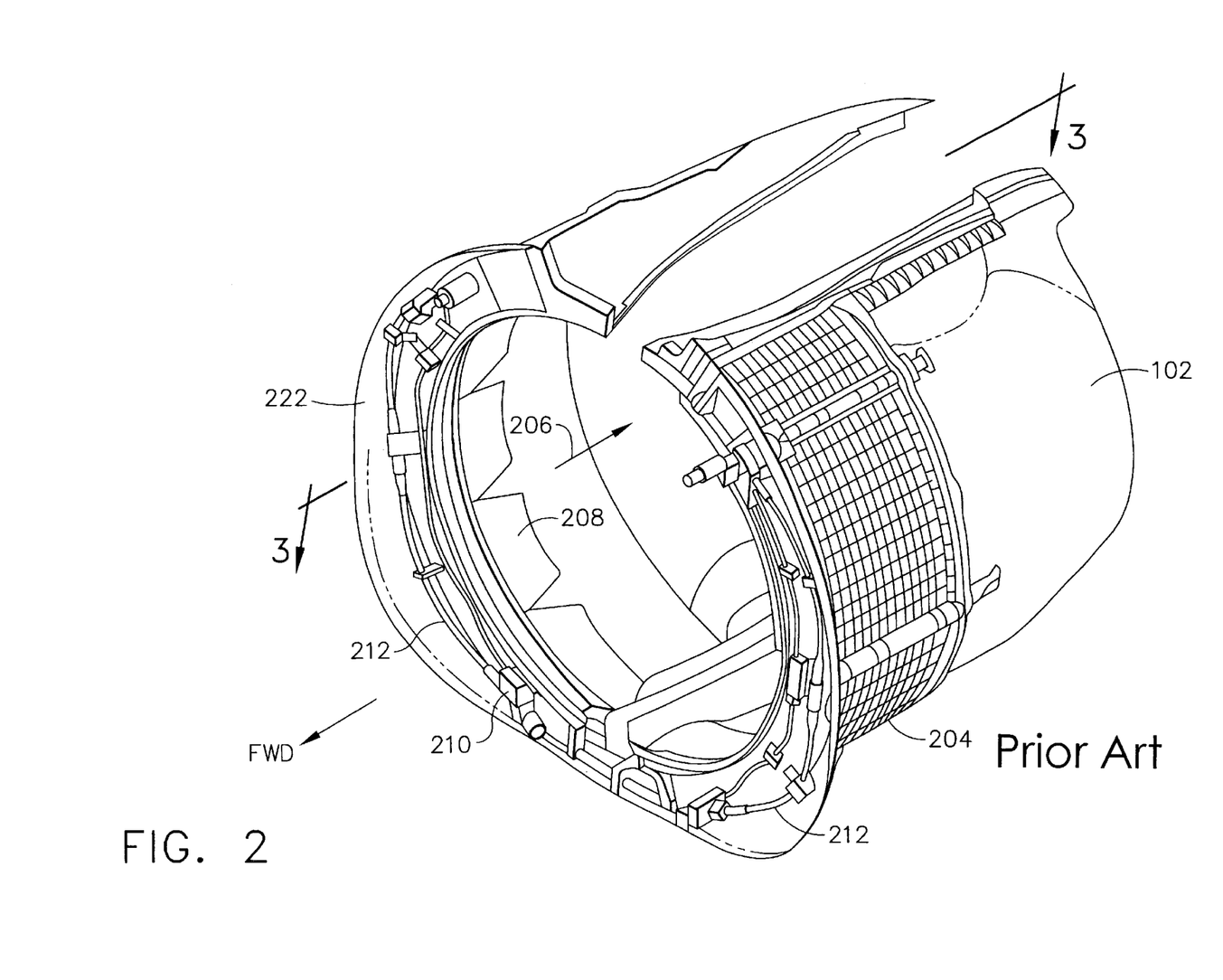
FIG. 2 is a perspective view of portions of an engine fan cowl and thrust reverser system utilized with the engine of FIG. 1.
Figure 3:
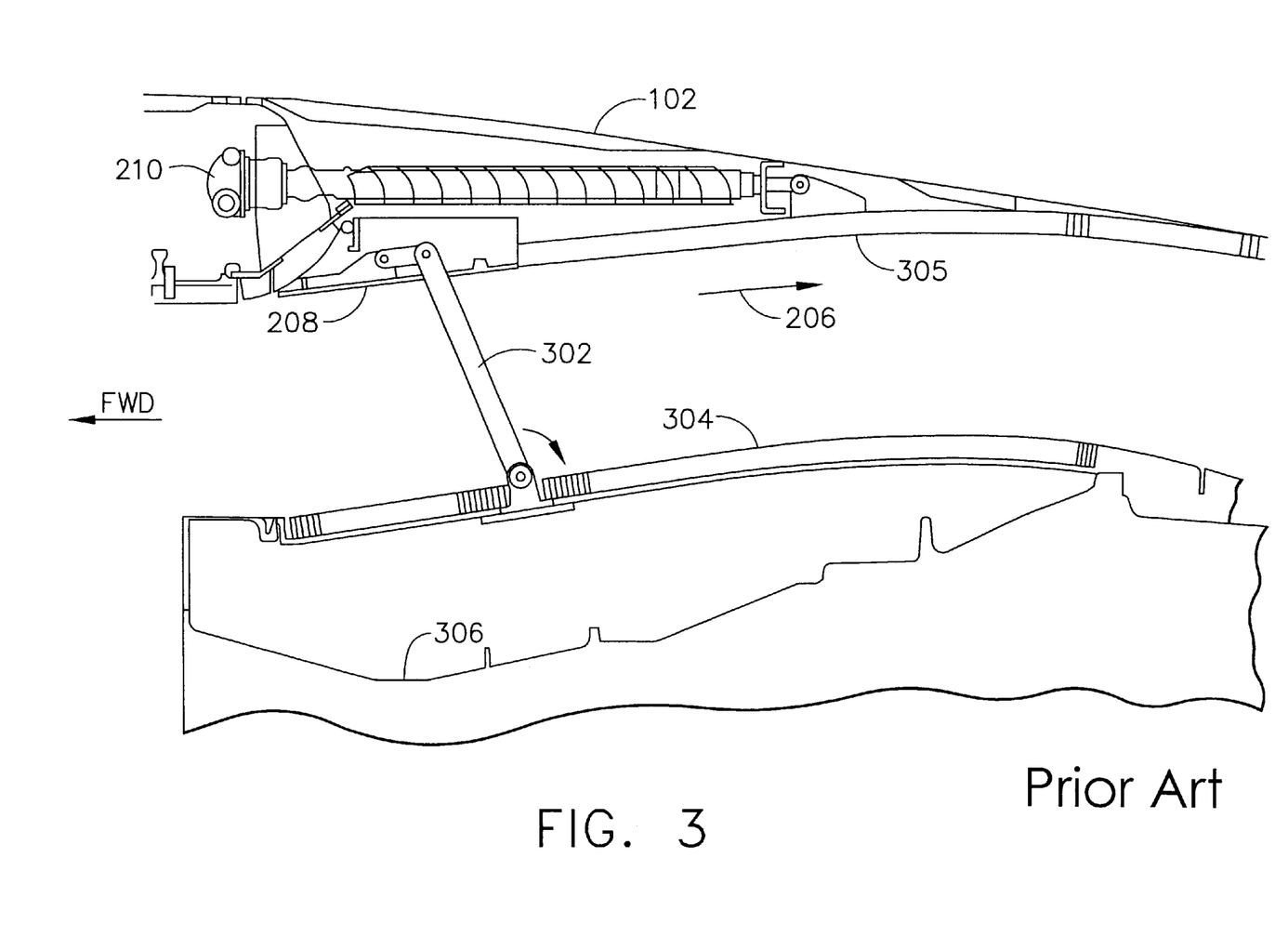
FIG. 3 is a partial cross section view taken along line 3–3 of FIG. 2.
Figure 4:
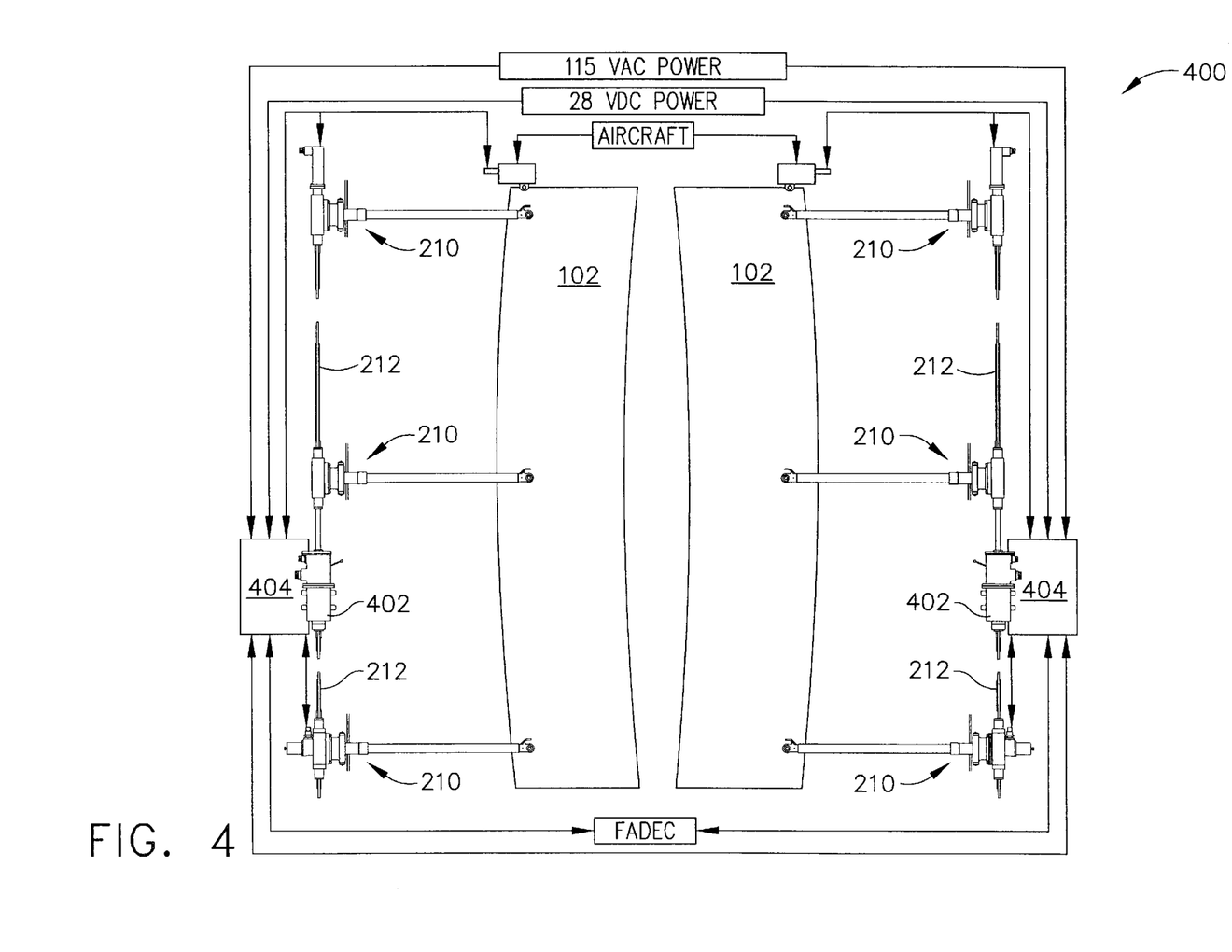
FIG. 4 is a simplified functional schematic representation of an exemplary thrust reverser actuation control system according to an embodiment of the present invention.

As shown more particularly in FIGS. 2, 3, and 4, the transcowls 102 cover a plurality of cascade vanes 204, which are positioned between the transcowls 102 and a bypass air flow path 206. A series of blocker doors 208 are mechanically linked to the transcowls 102 via a drag link 302 that is rotatably connected to an inner wall 304 that surrounds the engine case 306. In the stowed position, the blocker doors 208 form a portion of an outer wall 305 and are therefore oriented parallel to a bypass air flow path 206. When the thrust reversers are commanded to deploy, the transcowls 102 are translated aft, causing the blocker doors 208 to rotate into a deployed position, such that the bypass air flow path 206 is blocked. This also causes the cascade vanes 204 to be exposed and the bypass air flow to be redirected out the cascade vanes 204. The re-direction of the bypass air flow in a forward direction creates a reverse thrust and, thus, works to slow the airplane.

One or more actuators 210 per engine are used to operate the transcowls 102. The actuators 210 are mounted to a stationary torque box 222 and are coupled to the transcowls 102. It is noted that the actuators 210 may be any one of numerous actuator designs known in the art. However, in this embodiment the actuators 210 are ballscrew actuators. It is additionally noted that the number and arrangement of actuators 210 is not limited to what is depicted in FIG. 2, but could include other numbers of actuators 210 as well. The number and arrangement of actuators is selected to meet the specific design requirements of the system.

The actuators 210 are interconnected via a plurality of synchronization mechanisms 212, each of which, in the particular depicted embodiment, comprises a flexible shaft. The synchronization mechanisms 212 ensure that the actuators 210, and thus the transcowls 102, move in a substantially synchronized manner. For example, when one transcowl 102 is moved, another transcowl 102 is moved a like distance at substantially the same time. Other synchronization mechanisms that may be used include gears, or any other mechanism or design that transfers power between the actuators 210.

A control system controls movement of the transcowls 102 from a locked and stowed position to an unlocked and deployed position for producing reverse thrust, and returns the transcowls 102 from the deployed position back to the stowed and locked position. A simplified functional schematic representation of an exemplary thrust reverser actuation control system is depicted in FIG. 4. The control system 400 includes the actuators 210, each coupled to a transcowl 102, and interconnected by the synchronization mechanisms 212. Each of actuators 210 is driven by one or more power sources. The one or more power sources may be a hydraulic power source, a pneumatic power source, or an electric power source. In a preferred embodiment, the power source is electric and, more specifically, is an electric motor 402 that is controlled by a controller circuit 404. As will be discussed in more detail below, one or more of the actuators 210 includes an integral locking mechanism that prevents unintended movement of the transcowls 102 from the stowed position.

With reference now to the remaining figures, a detailed description of various embodiments of an actuator 210 according to the present invention will be provided. As previously noted, it is to be appreciated that although the actuators 210 depicted and described herein are ballscrew type actuators, the present invention encompasses other types of actuator designs. In any case, turning first to FIG. 5, which depicts a cross section view of an actuator 210 with an integral locking mechanisms, a detailed discussion of a particular embodiment will now be provided. The actuator 210 includes a drive shaft 502 rotationally mounted within a housing 504 by bearing elements 506, such that the drive shaft 502 rotates about an axis of rotation 501. The draft shaft 502 has first 503 and second 505 ends that are adapted to couple the drive shaft 502 to one or more synchronization mechanisms 212 when the actuator 210 is installed in a thrust reverser system. The drive shaft 502 includes one or more protrusions 508 extending from its outer surface. The purpose of the protrusions 508 will be discussed in more detail below. The drive shaft further includes gearing 510 that meshes with a bevel gear 512. The bevel gear 512 is coupled to a ballscrew shaft 514, which is rotationally supported by a duplex bearing assembly 516. One end of the ballscrew shaft 514 is connected, via a gimbal mount 517, to the forward end of the engine nacelle support (not illustrated). A ball nut 518, which is rotationally supported on the ballscrew shaft 514 by a plurality of ball bearing assemblies 520, is attached to one of the transcowls 102 (not illustrated). Thus, rotation of the drive shaft 502 causes rotation of the ballscrew shaft 514, which results in translation of the ball nut 518 and transcowl 102.

Figure 5:
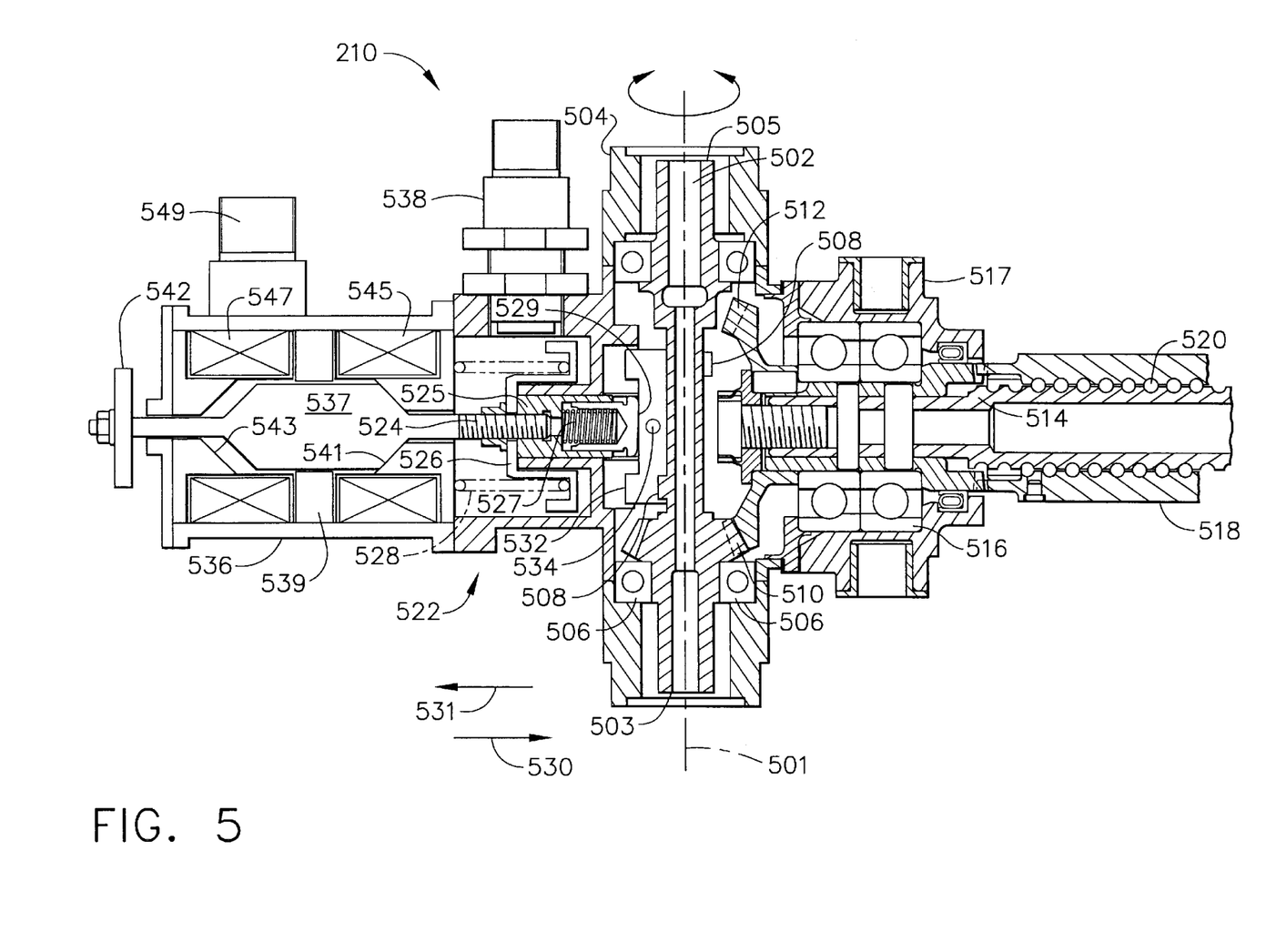
FIG. 5 is a cross section view of a first embodiment an actuator that may be used in the thrust reverser actuation system depicted in FIG. 4.

The actuator 210 also includes a locking device 522 mounted within the housing 504. The locking device 522 includes a rod 524 coupled to a piston assembly 525. A target assembly 526 surrounds the rod and abuts an end of the piston assembly 525. The target assembly 526 includes a biasing device 528, such as a spring, that biases the piston assembly 525 and rod 524 toward a first position (indicated by directional arrow 530). Preferably, the rod 524 and piston assembly 525 are configured such that their longitudinal axes are normal to the axis of rotation 501 of the drive shaft 502. A locking bar 532 is pivotally mounted proximate a first end of the piston assembly 525 using a pin 534, such that its longitudinal axis is perpendicular to that of the rod 524, and substantially coplanar with the drive shaft's axis of rotation 501. The piston assembly 525 is "springloaded," meaning it includes a spring 527 that is biased against the internal surface of the piston assembly 525. An end surface 529 of the piston assembly 525 that contacts the locking bar 532 is slightly tapered. This structure ensures that the locking bar 532, when in the first position 530, will pivot and, if the drive shaft 502 includes more than one protrusion 508, will also ensure that the locking bar 532 engages at least one of the protrusions 508 even if the other end of the locking bar 532 is on top of another protrusion 508. Thus, as will be discussed further below, the locking bar 532 will prevent rotation of the drive shaft 502 in a first rotational direction.

A solenoid 536 is mounted to the housing 504 and is coupled to a second end of the rod 524. In a preferred embodiment, the solenoid 536 is a so-called "latching solenoid," having at least two positions. The term "latching solenoid" means that the solenoid requires input electrical energy to move it between the two positions. As FIG. 5 depicts, the solenoid 536 includes an armature 537, a permanent magnet 539, first and second pole faces 541, 543, first and second series-wound coils 545, 547, and an input receptacle 549. The armature 537 is coupled at one end to the rod 524 and at another end to a manual release mechanism 542, which is discussed further below, and is constructed of a magnetically permeable material, such as iron. The permanent magnet 539 emits a magnetic flux that holds the armature 537 in whatever position it is in when electrical energy is removed from the first 545 and second 547 series-wound coils. When energized, the first 545 and second 547 series-wound coils, which are positioned one each on either side of the permanent magnet 539, develop an electromagnetic flux polarity that overcomes the magnetic flux of the permanent magnet 539, and cause the armature 537 to move. The input receptacle 539 is coupled to receive an input signal of appropriate polarity from external equipment such as, for example, the actuator control system controller circuit 404, to selectively energize the first 545 and second series-wound coils and move the armature 537 between locked and unlocked positions.

Specifically, when the first 545 and second 547 coils are energized with a signal of a first polarity, the electromagnetic flux polarity generated by the first and second coils 545, 547 is such that the armature 537 moves the rod 524, and thus the locking bar 532, toward a second position 531, away from the drive shaft 502. The armature 537 will abut against the second pole face 543 and then, when the signal supplied to the first 545 and second 547 coils is removed, is held in this position by the permanent magnet 539. Conversely, when the first 545 and second 547 coils are energized with a signal of a second polarity, the electromagnetic flux polarity generated by the first and second coils 545, 547 is such that the armature 537 urges the rod 524 and locking bar 532 toward the first position 530, placing the locking bar 532 proximate, or against, the drive shaft 502. The armature 537 will abut against the first pole face 541 and then, when the signal supplied to the first 545 and second 547 coils is removed, is held in this position by the permanent magnet 539. As will be described in more detail below, when the rod 524 and locking bar 532 are in the first position 530, which is the "locked" position, the drive shaft 502 is prevented from rotating in a first rotational direction but is allowed to rotate in a second rotational direction. On the other hand, when the rod 524 and locking bar 532 are in the second position 531, which is the "unlocked" position, the drive shaft 502 is allowed to rotate in both the first and second rotational directions.

It will be appreciated that other solenoid configurations, including a configuration in which the armature 537 is spring-biased toward the first position 530 and is energized to move to the second position 531, may also be used. However, the solenoid configuration 536 described above is preferred since electrical power is not required to hold the armature 537, and thus the locking bar 532, in the unlocked position. Thus, if a momentary loss of electrical power occurs, the locking bar 532 will not move into the locked position and potentially damage the locking bar 532 and drive shaft 502. Additionally, because the solenoid 536 is only energized to move it to the appropriate position, the preferred configuration allows a short energization duty cycle, which allows the solenoid 536 to have a lower weight and smaller size.

When the actuator 210 is installed in a thrust reverser system, it is desirable that the position of the locking device 522 be known to the pilots or maintenance personnel. Thus, a position sensor 538 is also mounted to the housing 504. The position sensor 538, which may be one of any numerous sensors known in the art such as, for example, an optical sensor, a magnetic proximity sensor, or a limit switch, supplies an electrical signal to the controller circuit 404 that is representative of the position of the locking device 522. In this way, the actuator control system is aware when the locking device 522 is in the first, locked position 530 and the second, unlocked position 531.

The actuators 210 need to undergo period preventive, and sometimes corrective, maintenance. Many of the procedures associated with these maintenance activities require that the actuator 210 be unlocked, while the solenoid 536 is simultaneously de-energized. Hence, to accommodate such maintenance procedures, a manual release mechanism 542 is provided. The manual release mechanism 542, when operated, moves the piston assembly 526, and thus the rod 524 and locking bar 532, against the force of the biasing spring 582 into the second, unlocked position. With the drive shaft 502 unlocked, it is free to be rotated in both the first and second rotational directions, as required for maintenance purposes.

Figure 6:
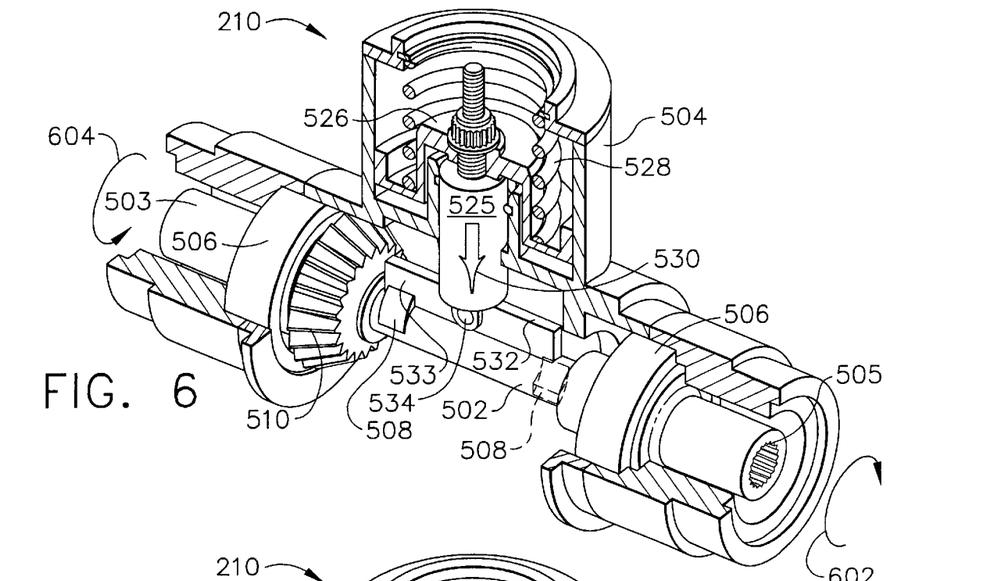
FIG. 6 is a partial cut-away cross section view of portions of the actuator shown in FIG. 5, the actuator in a locked condition.
Figures 7, 8:
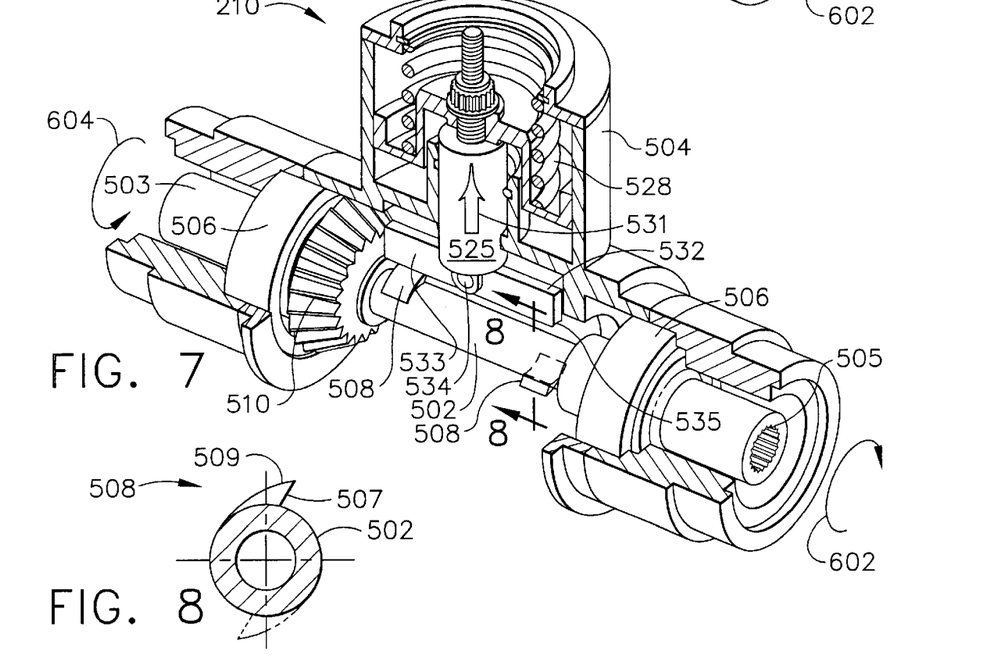
FIG. 7 is a partial cut-away cross section view of portions of the actuator shown in FIG. 5, depicting the actuator in an unlocked condition.
FIG. 8 is a cross section view of a drive shaft taken along line 8–8 in FIG. 7.

As was noted above, when the locking device 522 is in the first, locked position, the drive shaft 502 is prevented from rotating in a first rotational direction but is allowed to rotate in a second rotational direction. Alternatively, when the locking device 522 is in the second, unlocked position, the drive shaft 502 is allowed to rotate in both the first and second rotational directions. With reference to FIGS. 6, 7, and 8, in which like parts to those previously described are given like reference numerals, the structural features that provide this functionality will now be discussed. Referring first to FIGS. 6 and 7, which depict partial cut-away perspective views of portions of the actuator 210 in locked and unlocked conditions, respectively, it is seen that when the rod 524, the piston assembly 525, and locking bar 532 are in the first, locked position 530 (FIG. 6), the protrusions 508 extending from the drive shaft 502 prevent the drive shaft 502 from rotating in the first rotational direction 602, while simultaneously allowing the drive shaft 502 to be rotated in the second rotational direction 604. Conversely, when the rod 524, the piston assembly 525, and locking bar 532 are in the second, unlocked position 531 (FIG. 7), the drive shaft 502 is free to be rotated in both the first 602 and second 604 rotational directions.

As can be seen more explicitly in FIG. 8, each protrusion 508 includes a stop surface 507 and a tapered surface 509. The stop surface 507 on each protrusion 508 faces in the first rotational direction 602. With this configuration, when the rod 524 and locking bar 532 are in the first position, at least one of the stop surfaces 507 fixedly abuts against a side surface 533 of the locking bar 532, preventing rotation of the drive shaft 502 in the first rotational direction 602. The tapered surface 509 on each protrusion 508 extends gradually from the surface of the drive shaft 502 to the top of the stop surfaces 507. Since the locking bar 532 is pivotally mounted to the piston assembly 525, when the piston assembly 525 and locking bar 532 are in the first position 530, a bottom surface 535 of the locking bar 532 will be able to slide over the tapered surfaces 509 if the drive shaft 502 is rotated in the second rotational direction 604.

It is noted that when the actuators are installed in a thrust reverser system, such as the one depicted in FIGS. 1–4, the first rotational direction 602 will be the direction that causes the thrust reversers to move to a deployed position, and the second rotational direction 604 will be the direction that causes the thrust reversers to move to a stowed position. Thus, if the pilot commands the thrust reversers to deploy, the controller circuit 404 will energize the solenoids on each actuator 210 that includes an integral lock. This will cause the rod 524 and locking bar 532 to move to the second, unlocked position. The controller circuit 404 will then energize the motors 402 to drive the actuators 210 in the first rotational (deploy) direction 602. As noted above, rotation of the actuators 210 will result in translation of the transcowls 102 to uncover the cascade vanes 204, to produce a reverse thrust.

When the thrust reversers are no longer needed, the pilot will command the thrust reversers to move to the stowed position. In response, the controller circuit 404 will energize the motors 402 to drive the actuators 210 in the second rotational (stow) direction 604. Once the thrust reversers are at (or near) the stowed position, the controller circuit 404 will de-energize the motors 402 and the solenoids 536. De-energizing the solenoids 536 will cause the rod 524 and locking bar 532 on each actuator 210 having the integral lock to move, under the force of the biasing spring 528, to the first position 530. With the rod 524 and locking bar 532 in the first position 530, the drive shaft 502 will be able to continue rotating in the second rotational (stow) direction 604, if system inertia causes it to do so. However, rotation in the first rotational (deploy) direction 602 is prevented.

Figure 9:
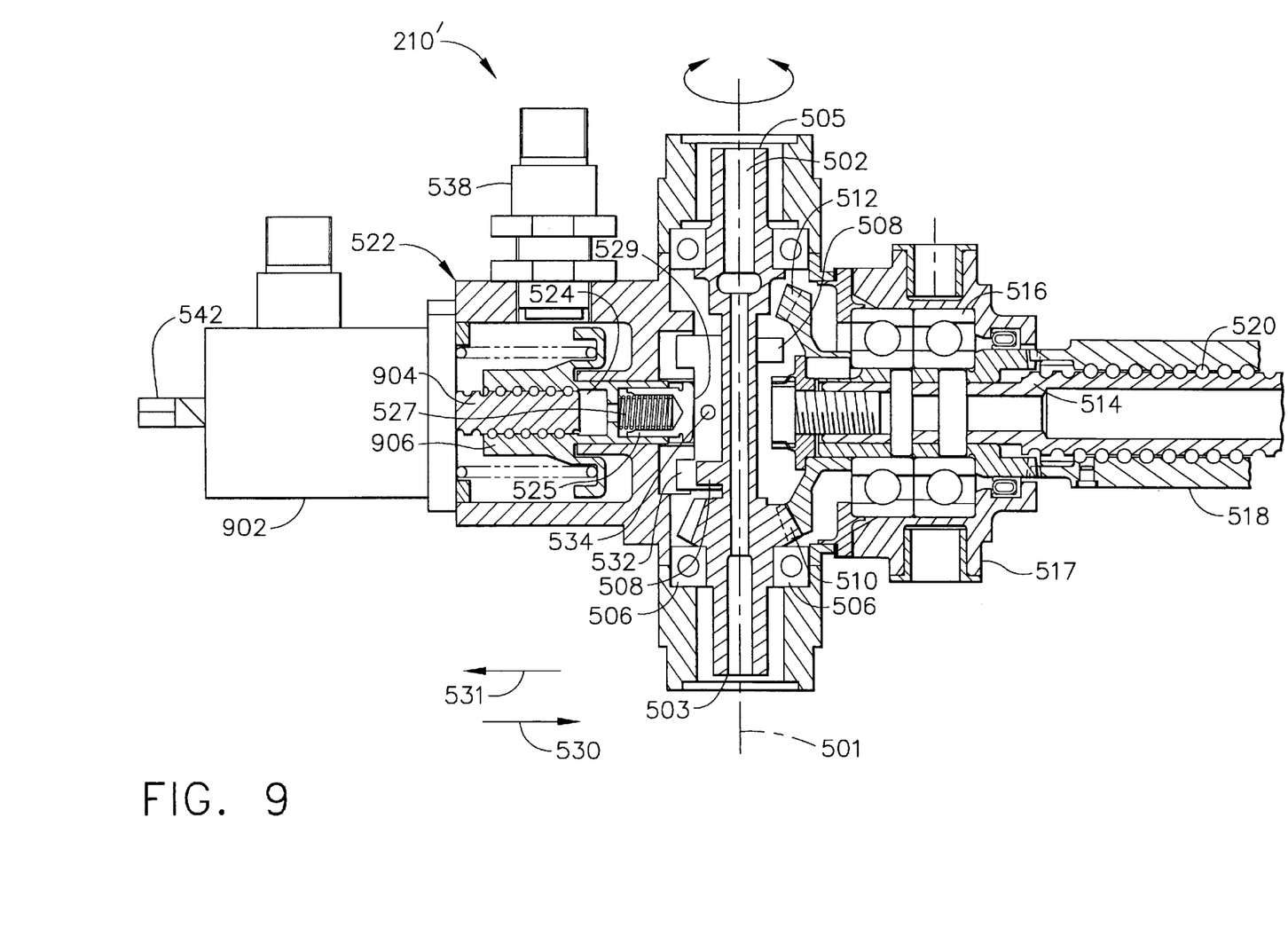
FIG. 9 is an alternate embodiment of an actuator that may be used in the thrust reverser actuation system depicted in FIG. 4.

An alternate embodiment of an actuator 210 that includes an integral locking mechanism is depicted in FIG. 9, in which like parts to those previously described are given like reference numerals. In this alternate embodiment, a motor 902, ballscrew 904, and ball nut 906 are used to move the rod 524 and locking bar 532 between the first and second positions, instead of using a solenoid 536. The actuator 210 is substantially identical in all other respects. Thus, energizing the motor 902 will rotate the ballscrew 904, which will cause the ball nut 906 and attached rod 524 to translate to the second position 531. With this embodiment, the rod 524 and locking bar 528 may be returned to the first position 530 by either energizing the motor 902 to rotate in the reverse direction, or deenergizing the motor 902 and allowing the biasing spring 528 to move the rod 524 and locking bar 532.

Although the above embodiments have been depicted and described as including two protrusions 508 on the drive shaft 502, the invention is not limited to this number of protrusions. Rather, the actuator 210 would operate as intended with only a single protrusion, or with more than two protrusions. Moreover, it will be appreciated that the invention is not limited to use of a locking bar 532 mounted to a rod 524. Indeed, the actuator 210 may include only the rod 524 and one or more closely spaced protrusions 508 against which the rod 524 would abut to prevent the drive shaft 502 from rotating in the first rotational direction 602.

As indicated previously, the present invention is not limited to use with a cascade-type thrust reverser system, but can be incorporated into other thrust reverser design types. Moreover, the present invention is not limited to use with an electric, electromechanical, or hydraulic thrust reverser actuation system. Indeed, the present invention can be incorporated into other actuation system designs, including pneumatic designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for moving a thrust reverser, comprising:
   at least one power source;
   at least two synchronization mechanisms; and
   at least two actuators each coupled to at least one of the synchronization mechanisms, at least one of the actuators having:
   a housing assembly having a first opening, a second opening, a third opening, and a first inside surface defining a first chamber extending along a first axis between the first and second openings, the third opening being located between the first and second openings;
   a drive shaft rotationally mounted between the openings within the chamber and in general alignment with the first axis, the drive shaft having a gear portion, a lock portion and a first end adapted to couple to at least one of the synchronization mechanisms, the gear and lock portions being located within the chamber;

an actuator extending from the third opening of the housing along a second axis that is perpendicular to the first axis, the actuator having a drive gear mounted to engage the gear portion of the drive shaft; and a lock movably mounted within the chamber in an opposite, generally opposed position to the actuator, the lock having at least a side surface and a bottom surface and selectively operable to move in a plane aligned with the second axis between at least a first position and a second position;

wherein the lock portion of the drive shaft has at least one protrusion extending radially outwardly, each protrusion having a stop surface positioned to engage the lock side surface when the lock is in the first position to prevent the rotation of the drive shaft.

2. The system of claim 1, wherein the stop surface of each protrusion is positioned to not engage the lock side surface when the lock is in the second position to allow rotation of the drive shaft.

3. The actuator of claim 2, wherein each protrusion additionally has a tapered surface extending from the outer surface of the drive shaft to a top portion of the stop surface.

4. The system of claim 1, wherein the stop surface on each protrusion extends substantially perpendicularly from the outer surface of the drive shaft.

5. The system of claim 1, wherein each power source is an electric motor.

6. The system of claim 1, wherein the chamber includes an opening located generally opposite the third opening in the housing, and wherein the lock comprises:

a piston assembly mounted within the housing and having a first end and a second end, the piston assembly first end extending through the opening in the chamber and coupled to the lock to move the lock between the first position and the second position.

7. The system of claim 6, further comprising:

a rod mounted within the housing and having a first end and a second end, the rod first end coupled to the piston second end;

a target assembly mounted within the housing and surrounding the rod, the target assembly having a first end abutting the piston assembly second end; and a spring mounted within the housing and surrounding at least a portion of the target assembly and configured to bias the target assembly toward the first position.

8. The system of claim 1, further comprising:

an electromechanical operating mechanism coupled to the lock to move the lock between the first position and the second position in response to receiving an electrical signal.

9. The system of claim 8, wherein the electromechanical operating mechanism comprises a solenoid.

10. The system of claim 9, wherein the solenoid comprises a latching-type solenoid.

11. The system of claim 8, wherein the electromechanical operating mechanism comprises a motor.

12. The system of claim 1, further comprising:

a position sensor coupled to the housing and operable to sense the position of the lock.

13. The system of claim 12, wherein the at least one protrusion comprises two protrusions.

14. The system of claim 1, wherein the chamber includes an opening located generally opposite the third opening in the housing, and wherein the lock comprises:

a piston assembly mounted within the housing and having a first end and a second end, the piston assembly first end extending through the opening in the chamber; and a locking bar pivotally coupled to the piston assembly first end and extending in a plane that is substantially coplanar with the first axis, the locking bar having the side surface and the bottom surface.

15. A thrust reverser actuator with an integrated lock for use in a system having at least one synchronization mechanism for moving a thrust reverser between deployed and stowed positions, the actuator comprising:

a housing assembly having a first opening, a second opening, a third opening and an inside surface defining a first chamber extending along a first axis between the first and second openings, the third opening being located between the first and second openings;

a drive shaft rotationally mounted between the openings within the chamber and in general alignment with the first axis, the drive shaft having a gear portion, a lock portion and first end adapted to couple to the synchronization mechanism, the gear and lock portions being located within the chamber;

an actuator extending from the third opening of the housing along a second axis that is perpendicular to the first axis, the actuator having a drive gear mounted to engage the gear portion of the drive shaft; and a lock movably mounted within the chamber in an opposite, generally opposed position to the actuator, the lock having at least a side surface and a bottom surface and selectively operable to move in a plane aligned with the second axis between at least a first position and a second position;

wherein the lock portion of the drive shaft has at least one protrusion extending radially outwardly, each protrusion having a stop surface positioned to engage the lock side surface when the lock is in the first position to prevent the rotation of the drive shaft.

16. The actuator of claim 15, wherein the lock side surface is not fixedly abutted by the stop surface on the at least one protrusion when in the second position, thereby allowing rotation of the drive shaft in both the first rotational direction and the second rotational direction.

17. The actuator of claim 15, wherein the stop surface on each protrusion extends substantially perpendicularly from the outer surface of the drive shaft.

18. The actuator of claim 17, wherein each protrusion additionally has a tapered surface extending from the outer surface of the drive shaft to a top portion of the stop surface.

19. The system of claim 15, wherein the chamber includes an opening located generally opposite the third opening in the housing, and wherein the lock comprises:

a piston assembly mounted within the housing and having a first end and a second end, the piston assembly first end extending through the opening in the chamber and coupled to the lock to move the lock between the first position and the second position.

20. The system of claim 19, further comprising:

a rod mounted within the housing and having a first end and a second end, the rod first end coupled to the piston second end;

a target assembly mounted within the housing and surrounding the rod, the target assembly having a first end abutting the piston assembly second end; and a spring mounted within the housing and surrounding at least a portion of the target assembly and configured to bias the target assembly toward the first position.

21. The actuator of claim 15, further comprising:

an electromechanical operator coupled to the lock and operable to move the lock between the first position and the second position in response to receiving an electrical signal.

22. The actuator of claim 21, wherein the electromechanical operator comprises a solenoid.

23. The actuator of claim 22, wherein the solenoid comprises a latching-type solenoid.

24. The actuator of claim 21, wherein the electromechanical operator comprises a motor.

25. The actuator of claim 15, further comprising:

a position sensor coupled to the housing and operable to sense the position of the lock.

26. The actuator of claim 15, wherein the chamber includes an opening located generally opposite the third opening in the housing, and wherein the lock comprises:

a piston assembly mounted within the housing and having a first end and a second end, the piston assembly first end extending through the opening in the chamber; and a locking bar pivotally coupled to the piston assembly first end and extending in a plane that is substantially coplanar with the first axis, the locking bar having the side surface and the bottom surface.

27. The actuator of claim 26, wherein the at least one protrusion comprises two protrusions.

28. A thrust reverser actuator with an integrated lock for use in a system having at least one synchronization mechanism for moving a thrust reverser between deployed and stowed positions, the actuator comprising:

a housing assembly having a first opening, a second opening, a third opening, a fourth opening, and an inside surface defining a chamber extending along a first axis between the first and second openings, the third opening being located between the first and second openings, the fourth opening being located coplanar with the third opening, and the chamber including an opening located between and generally opposite the third and fourth openings;

a drive shaft rotationally mounted between the first and second openings within the chamber and in general alignment with the first axis, the drive shaft having a gear portion, a lock portion, and at least a first end adapted to couple to the synchronization mechanism, the gear and lock portions being located within the chamber;

an actuator extending from the third opening of the housing along a second axis that is perpendicular to the first axis, the actuator having a drive gear mounted to engage the gear portion of the drive shaft; and a piston assembly mounted within the housing and having a first end and a second end, the piston assembly first end extending through the opening in the chamber;

a locking bar pivotally coupled to the piston assembly first end and extending in a plane that is substantially coplanar with the first axis, the locking bar having at least a side surface and a bottom surface;

a rod mounted within the housing and having a first end and a second end, the rod first end coupled to the piston assembly second end;

an electromechanical operating mechanism mounted to the housing and having an operating element extending through the fourth opening and coupled to the rod second end, the electromechanical operating mechanism selectively operable to move the rod between at least a first position and a second position in a plane aligned with the second axis;

a target assembly mounted within the housing and surrounding the rod, the target having a first end abutting the piston assembly second end;

a spring mounted within the housing and surrounding at least a portion of the target assembly and configured to bias the target assembly toward the first position; and a position sensor coupled to the housing proximate the piston and operable to sense a position of the locking bar by sensing a position of the piston, wherein the lock portion of the drive shaft has at least one protrusion extending radially outwardly, each protrusion having a stop surface positioned to engage the locking bar side surface when the locking bar is in the locked position to prevent the rotation of the drive shaft.

* * * * *